Nov. 18, 1930.  J. W. CROSS ET AL  1,782,231
SEAT
Filed Dec. 13, 1929  2 Sheets-Sheet 2
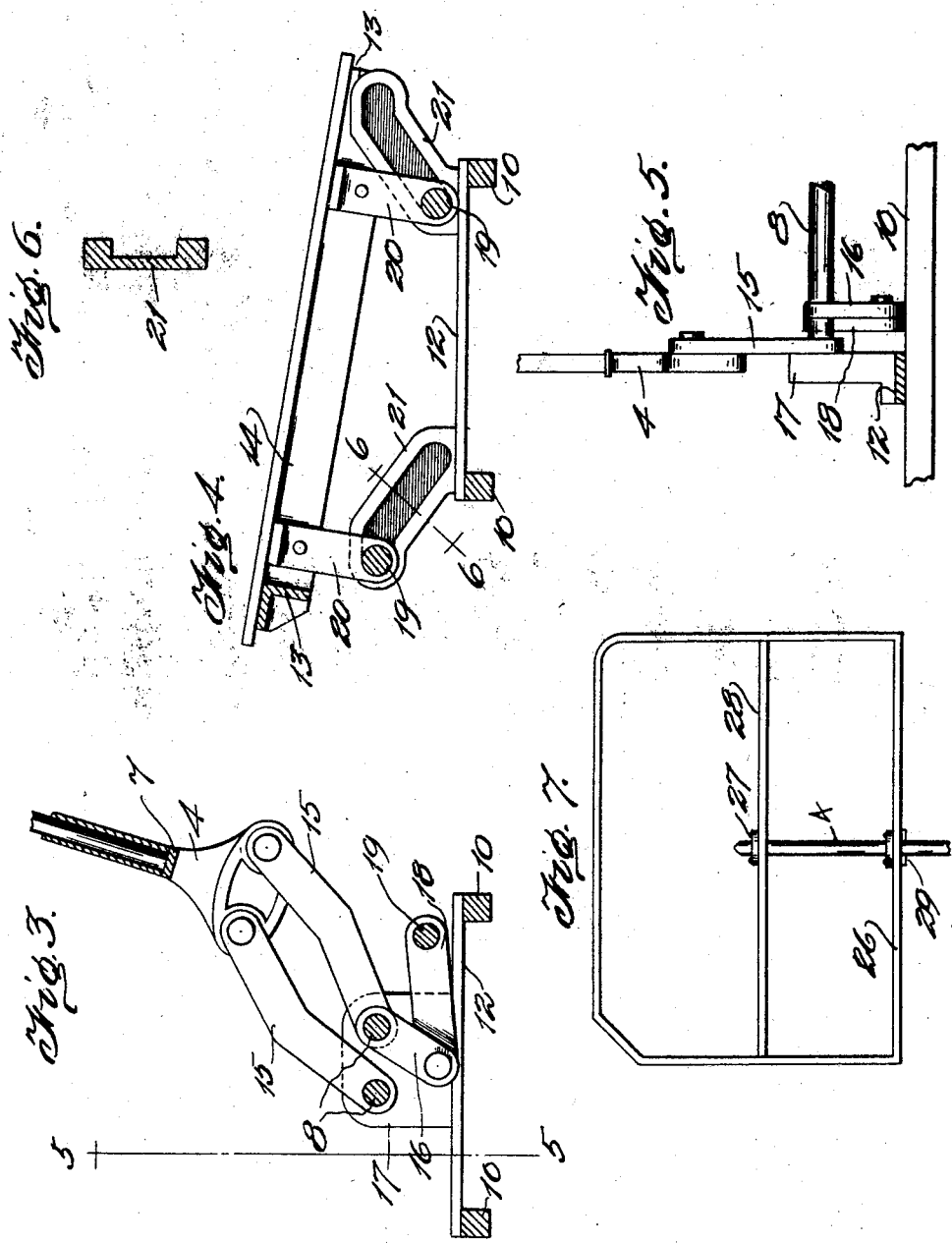
J.W. CROSS INVENTOR.
E.E. JOHNSON.
BY
ATTORNEYS.

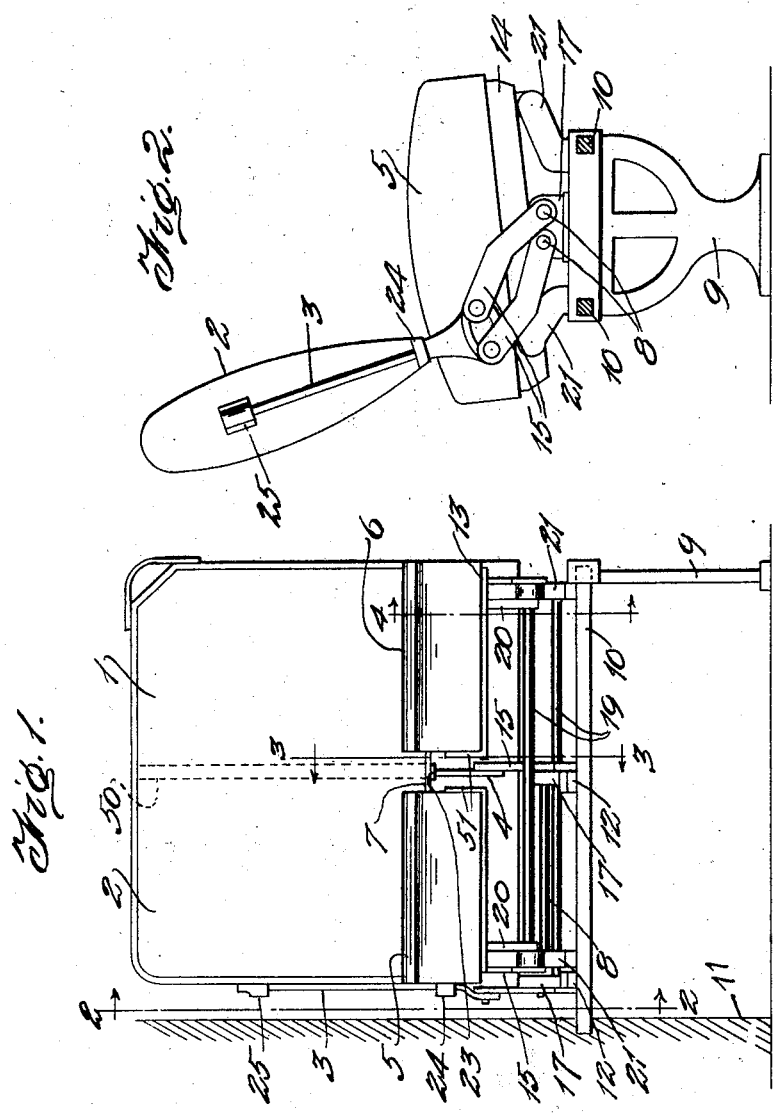

Patented Nov. 18, 1930

1,782,231

UNITED STATES PATENT OFFICE

JAMES WILLIAM CROSS, OF FINSBURY PAVEMENT, LONDON, AND ERIC ELDRIDGE JOHNSON, OF TOTTENHAM, LONDON, ENGLAND

SEAT

Application filed December 13, 1929, Serial No. 413,839, and in Great Britain December 10, 1928.

The present invention relates to seats, more particularly of the public service type, such as are used in conveyances, such as electric trains and tramcars, and omnibuses. These seats sometimes have fixed backs and sometimes have reversible backs which can be swung over to suit opposite directions of travel, the arrangement being generally such that the seat proper also has a to-and-fro movement imparted to it by the swinging movement of the seat back.

As hitherto constructed, such seats have the disadvantage that owing to the presence of a swinging lever and associated mechanism at the outer end of the seat, the inner end being adjacent to the side of the vehicle, there is a risk of the clothing of passengers becoming caught in the mechanism of the seat or drawn in behind the usual end protection plate, and an important object of this invention is to provide a construction of reversible seat which is free from this disadvantage.

Another object is to provide a seat construction which allows the required seating space to be provided with a smaller over-all dimension of seat, giving greater gangway space where necessary, or alternatively a wide seating space.

The invention also concerns any construction of seat in which the seat back frame is carried by an arm or arms projecting upwardly from the seat understructure, whether said arms are movable or not. In this connection an important object of the invention is to provide a seat back which is removably mounted on its supporting arms. To this end, the seat back or back cushion is provided with one or more holes or sockets adapted to fit on to one or more seat back levers or arms projecting upwardly from the lower part of the seat, said lever or levers, or arm or arms, projecting for so far as may be found suitable into the seat back or back cushion. For example, they may extend for only a short distance therein from the lower edge of the back cushion or frame, or they may extend for the full width or height of the cushion or seat back.

In order that the invention may be clearly understood and readily carried into practice, we have appended hereto two sheets of drawings, illustrating the same, wherein:—

Figure 1 is a front elevation of a chair constructed in accordance with this invention.

Figure 2 is a section on the line 2—2 of Figure 1.

Figure 3 is an enlarged section on the line 3—3 of Figure 1.

Figure 4 is an enlarged section on the line 4—4 of Figure 1.

Figure 5 is a section on the line 5—5 of Figure 3.

Figure 6 is a section on the line 6—6 of Figure 4.

Figure 7 is an elevation of a modified form of seat back frame.

The drawings illustrate, in Figures 1 and 2, a double seat in which the seat back 1, 2 is mounted on a pair of pivoted swing-over levers, one of which, 3, is located adjacent to the side of the vehicle, and the other of which, 4, is located mid-way along the length of the seat in the dividing line between the two seat portions 5 and 6. Thus the seat back 2 of the outer seat 6 constitutes an overhung extension of the seat back 1 of the inner seat 5. The lever 3 is cranked, as shown, so that the end of the seat back 1 is vertically above the end of the seat 5, and the two levers 3 and 4 are constrained to move as one by the bar 7 of the seat back frame, which overhangs the seat cushion 6.

The seat under-structure of the seat is immaterial to the invention, but preferably it comprises a standard 9, which supports longitudinal angle iron bearers 10 adapted to be secured at their opposite ends to the wall 11 of the vehicle and connected together by cross braces 12.

The seat cushions 5 and 6, or a single slotted cushion in lieu thereof, are or is mounted upon a common supporting frame or cradle built up of longitudinal angle iron members 13 and transverse angle iron braces 14.

Each of the seat back levers 3, 4 is enlarged at its lower end and pivoted to a pair of substantially parallel links 15, which links are somewhat bowed apart medially. The opposite ends of the links 15 are mounted on shafts 8 rotatable in brackets 17 upstanding from the cross braces 12 of the understructure. One of the shafts 8 carries crank arms 16 pin-jointed to links 18 rotatable at their other end on one of the rods 19 carried by the seat frame 13, 14. The two rods 19 are mounted in depending bracket plates 20 fastened to the angle members 14 of the seat, while their ends are engaged in inclined groves in the four cam members 21 mounted on the bars 10 of the seat understructure.

When the seat back 1, 2 is thrown over, the link mechanism 15, 16 causes the seat to move transversely, consequent upon which the rods 19 slide up or down in the inclined grooves of the cam members 21, and thus the seat is tilted upwardly at its new front edge, and downwardly at its rear edge. This movement of the seat is accomplished in the following manner. As shown in Figures 3 and 4 the seat back is swung to the right and the left hand side of the seat bottom is tilted up so that the right hand rod 19 is at the lower end of the guide 21. The right hand link 15 is fixed on its shaft 8 so that it forms a rock arm to oscillate said shaft. Similarly the arm 16 is fixed on said shaft to rock therewith and, as the links 18 connect this arm and the right hand rod 19, movement of the seat back to the left rotates the shaft 8 and thus swings the arm 16 to the right and the links 18 push the rod 19 to which they are connected, upwardly to the right. This tilts the right side of the seat bottom up and the left side slides down and to the right.

According to a modification the lever 3 may be omitted and the seat back wholly supported by the central lever 4, as illustrated by Figure 7, whilst the length of the seat may be such as to provide only a single seating space, in which case the lever 4 would move in a central transverse slot in the seat cushion.

The seat back 1, 2 of Figures 1 and 2 is removably mounted on the levers 3 and 4, for which purpose the lever 4 fits into a tube 50 contained in the seat back 1, 2. The upper end of the tube may be closed to form a stop for the end of the lever 4, and a collar or flange 23 may be provided on the lever 4 upon which the lower bar 7 of the seat back 1, 2 rests. The lever 3 at the end of the seat back is disposed externally of the seat back, and passes through a strap or eye member 24 adjacent the lower edge of the seat. Its upper end fits into a socket 25 mounted on the end of the seat back at a convenient height.

In the case of the modification illustrated by Figure 7, the lever 4, instead of fitting into a tube in the seat back 1, 2, passes through the lower cross member 26 of the seat back frame and engages in a socket 27 carried by an intermediate cross bar 28 of the seat back frame. Also, instead of providing the stop collar or flange 23, a cross pin 29 is provided through the lever 4 to serve as a stop member.

Although not essential, the seat back lever 4 preferably moves, where it passes through the seat cushions and frame, between parallel sheet metal guard plates 51 fixed to the seat understructure and constituting a guide box or slot. A similar provision may be made at the inner end of the seat for the lever 3.

It should be understood that although suitable mechanism has been hereinbefore described for moving the seat by movement of the seat back, any other suitable mechanism may be employed without departing from the invention.

The invention is not limited to the construction of double seats only, as it may be applied to seats designed to accommodate more than two persons. Any number of seat back throw-over levers and associated mechanisms may be provided, provided that no lever mechanism is provided at the outer end of the seat, and the end seating space has an overhung back. In the case of seats having three or more seating spaces, the backs of both end seating sections may be overhung and a seat back carried only by lever arms disposed at intervals along the medial portion of the seat between the seating spaces.

What we claim is:—

1. A reversible double car seat including a main frame supported at the car wall and in spaced relation thereto, a pair of spaced inner and outer seat bottoms supported on said frame, the inner of said seat bottoms having a side adjacent but spaced from the car wall, a seat back frame support between the wall and adjacent seat bottom, a second seat back frame support between said seat bottom, said supports being mounted for swinging movement transversely of the seat on said main frame; and a seat back frame supported on said supports and having a portion overhanging the full width of the outer seat bottom and free from connection with the outer seat bottom and main frame.

2. A reversible double car seat including a main frame supported at the car wall and in spaced relation thereto, a pair of spaced inner and outer seat bottoms tiltably supported on said frame, the inner of said seat bottoms having a side adjacent but spaced from the car wall, a seat back frame support between the wall and adjacent seat bottom, a second seat back frame support between said seat bottom, said supports being mounted for swinging movement transversely of the seat on said main frame, a seat back frame supported on said supports and having a portion overhanging the full width of the outer seat bottom and free from connection with the outer seat bottom and main frame, and a linkage connecting the back frame supports and seat bottoms to tilt the latter upon swinging of the back frame.

3. A reversible double car seat including, a main frame supported with one end adjacent a car wall, a pair of upwardly divergent guide cams at each end of the main frame, rods each engaging corresponding cam guides of said pairs, a pair of seat bottoms fixed on said rods, said seat bottoms comprising an inner seat bottom adjacent but spaced from said wall and outer seat bottom spaced from the inner seat bottom, a seat back frame support between the wall and adjacent seat bottom, a second seat back frame support between said seat bottom, said supports being mounted for swinging movement transversely of the seat on said main frame, and a seat back frame supported on said supports and having a portion overhanging the full width of the outer seat bottom and free from connection with the outer seat bottom and main frame.

4. A reversible double car seat including, a main frame supported with one end adjacent a car wall, a pair of upwardly divergent guide cams at each end of the main frame, rods each engaging corresponding cam guides of said pairs, a pair of seat bottoms fixed on said rods, said seat bottoms comprising an inner seat bottom adjacent but spaced from said wall and outer seat bottom spaced from the inner seat bottom, a seat back frame support between the wall and adjacent seat bottom, a second seat back frame support between said seat bottom, said supports being mounted for swinging movement transversely of the seat on said main frame, a seat back frame supported on said supports and having a portion overhanging the full width of the outer seat bottom and free from connection with the outer seat bottom and main frame, and a linkage connecting the back frame supports and seat bottoms to tilt the latter upon swinging of the back frame.

5. A reversible double car seat including, a main frame supported with one end adjacent a car wall, a pair of upwardly divergent guide cams at each end of the main frame, rods each engaging corresponding cam guides of said pairs, a pair of seat bottoms fixed on said rods, said seat bottoms comprising an inner seat bottom adjacent but spaced from said wall and outer seat bottom spaced from the inner seat bottom, a seat back frame support between the wall and adjacent seat bottom, a second seat back frame support between the seat bottoms, brackets at the inner end of the main frame and on said main frame between said seat bottoms, parallel shafts having their ends journalled in said brackets, pairs of spaced links connecting the seat back frame supports with said shafts, the links on one shaft being fixed thereto, rock arms on the last mentioned shaft, and links connecting said rock arms with one of said seat bottom supporting rods.

6. A reversible double car seat including, a main frame supported with one end adjacent a car wall, a pair of upwardly divergent guide cams at each end of the main frame, rods each engaging corresponding cam guides of said pairs, a pair of seat bottoms fixed on said rods, said seat bottoms comprising an inner seat bottom adjacent but spaced from said wall and outer seat bottom spaced from the inner seat bottom, a seat back frame support between the wall and adjacent seat bottom, a second seat back frame support between the seat bottoms, brackets at the inner end of the main frame and on said main frame between said seat bottoms, parallel shafts having their ends journalled in said brackets, pairs of spaced links connecting the seat back frame supports with said shafts, the links on one shaft being fixed thereto, rock arms on the last mentioned shaft, links connecting said rock arms with one of said seat bottom supporting rods, and a seat back frame supported on said supports and having its outer portion overhanging the width of the outer seat bottom and free from said bottom and main frame.

In testimony whereof we have signed our names to this specification.

JAMES WILLIAM CROSS.
ERIC ELDRIDGE JOHNSON.